United States Patent
Davies et al.

(10) Patent No.: US 9,673,724 B2
(45) Date of Patent: Jun. 6, 2017

(54) MATRIX CONVERTER AND METHOD FOR GENERATING AN AC VOLTAGE IN A SECOND AC VOLTAGE GRID FROM AN AC VOLTAGE IN A FIRST AC VOLTAGE GRID BY MEANS OF A MATRIX CONVERTER

(75) Inventors: Mark Davies, Howrah (AU); Mike Dommaschk, Möhrendorf (DE); Jörg Lang, Stadtsteinach (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 624 days.

(21) Appl. No.: 14/112,997

(22) PCT Filed: Apr. 19, 2012

(86) PCT No.: PCT/EP2012/057171
§ 371 (c)(1),
(2), (4) Date: Nov. 6, 2013

(87) PCT Pub. No.: WO2012/143449
PCT Pub. Date: Oct. 26, 2012

(65) Prior Publication Data
US 2014/0049110 A1 Feb. 20, 2014

(30) Foreign Application Priority Data
Apr. 19, 2011 (DE) .................. 10 2011 007 696

(51) Int. Cl.
*H02M 5/293* (2006.01)
*H02M 5/27* (2006.01)
(Continued)

(52) U.S. Cl.
CPC ........... *H02M 5/293* (2013.01); *H02M 5/271* (2013.01); *H02M 5/297* (2013.01); *H02M 7/49* (2013.01);
(Continued)

(58) Field of Classification Search
CPC ...... H02M 5/271; H02M 5/297; H02M 5/293; H02M 7/49; H02M 2007/4835; Y10T 307/549
See application file for complete search history.

(56) References Cited

U.S. PATENT DOCUMENTS

| 706,559 | A | * | 8/1902 | Hewlett | ................. H02H 7/262 307/112 |
| 1,916,927 | A | * | 7/1933 | Gay | ....................... H02H 7/266 307/112 |

(Continued)

FOREIGN PATENT DOCUMENTS

| CN | 101026350 A | 8/2007 |
| CN | 101461123 A | 6/2009 |

(Continued)

OTHER PUBLICATIONS

Wen, Jun, et al., "Synthesis of Multilevel Converters Based on Single and/or Threee-phase Converter Building Blocks", 2007, pp. 1780-1786, 33rd Annual Conference of Industrial Electronics Society, Taipei, vol. 1.

*Primary Examiner* — Rexford Barnie
*Assistant Examiner* — Elim Ortiz
(74) *Attorney, Agent, or Firm* — Laurence Greenberg; Werner Stemer; Ralph Locher

(57) ABSTRACT

A matrix inverter is connected to a first and a second multi-phase A.C. voltage network. First inductive elements are connected to the first A.C. voltage network and second inductive elements are connected to the second A.C. voltage network. A switch matrix connects the ends of the first inductive elements, to the ends of the second inductive elements. The switch matrix has inverter units. A regulation arrangement is connected to control inputs of the inverter units. The matrix inverter has a first inverter unit, which is arranged between the ends of the first inductive circuit (Continued)

elements and earth potential. The matrix inverter has a second inverter unit, connected between the ends of the first inductive circuit elements and the ends of the second inductive circuit elements. The regulation arrangement insures that the electrical power flowing to the matrix inverter is equal to the electrical power flowing out of the matrix inverter.

12 Claims, 2 Drawing Sheets

(51) Int. Cl.
*H02M 5/297* (2006.01)
*H02M 7/49* (2007.01)
*H02M 7/483* (2007.01)

(52) U.S. Cl.
CPC .. *H02M 2007/4835* (2013.01); *Y10T 307/549* (2015.04)

(56) References Cited

U.S. PATENT DOCUMENTS

| | | | | |
|---|---|---|---|---|
| 5,909,367 | A * | 6/1999 | Change | H02M 5/271 363/163 |
| 6,008,633 | A * | 12/1999 | Schettler | H02J 3/06 323/361 |
| 6,900,998 | B2 * | 5/2005 | Erickson | H02M 5/297 290/44 |
| 7,269,037 | B2 | 9/2007 | Marquardt | |
| 7,626,840 | B2 * | 12/2009 | Ueda | H02M 5/293 363/163 |
| 8,362,733 | B2 | 1/2013 | Inuduka et al. | |
| 2002/0093840 | A1 * | 7/2002 | Lacaze | H02M 5/271 363/152 |
| 2004/0022081 | A1 | 2/2004 | Erickson et al. | |
| 2008/0144342 | A1 * | 6/2008 | Du | H02M 7/49 363/71 |
| 2009/0059633 | A1 * | 3/2009 | Hara | H02M 5/293 363/126 |
| 2010/0204948 | A1 * | 8/2010 | Kirrmann | G01R 31/3272 702/117 |
| 2011/0006720 | A1 * | 1/2011 | Naiman | H02P 1/26 318/771 |
| 2011/0069519 | A1 * | 3/2011 | Moehlenkamp | H02M 5/257 363/149 |
| 2012/0068655 | A1 * | 3/2012 | Inuduka | H02M 1/126 318/494 |
| 2012/0201056 | A1 * | 8/2012 | Wei | H02P 21/0003 363/37 |
| 2013/0069439 | A1 | 3/2013 | Mertens et al. | |
| 2013/0328309 | A1 * | 12/2013 | Fujii | F03D 7/0272 290/44 |
| 2014/0049110 | A1 * | 2/2014 | Davies | H02M 5/271 307/52 |
| 2015/0333677 | A1 * | 11/2015 | Letas | F03D 9/003 290/44 |

FOREIGN PATENT DOCUMENTS

| | | |
|---|---|---|
| DE | 10217889 A1 | 11/2003 |
| DE | 102010013862 A1 | 10/2011 |
| EP | 2051361 A1 | 4/2009 |
| RU | 2293431 C1 | 2/2007 |
| WO | 2011021485 A1 | 2/2011 |

* cited by examiner

MATRIX CONVERTER AND METHOD FOR GENERATING AN AC VOLTAGE IN A SECOND AC VOLTAGE GRID FROM AN AC VOLTAGE IN A FIRST AC VOLTAGE GRID BY MEANS OF A MATRIX CONVERTER

BACKGROUND OF THE INVENTION

Field of the Invention

The invention relates to a matrix converter, which is connected firstly to a first polyphase AC voltage grid and secondly to a second polyphase AC voltage grid, comprising first inductive circuit elements, which are each connected to the first AC voltage grid, and second inductive circuit elements, which are each connected to the second AC voltage grid, comprising a switching matrix, which connects those ends of the first inductive circuit elements which are remote from the first AC voltage grid to those ends of the second inductive circuit elements which are remote from the second AC voltage grid, wherein the switching matrix comprises controllable converter units, and comprising a closed-loop control arrangement, which is connected to control inputs of the controllable converter units, wherein current and voltage measured variables of the first and second AC voltage grids are applied to the closed-loop control arrangement.

Such a matrix converter is described in the U.S. Pat. No. 6,900,998 B2. In this known matrix converter, those ends of the first inductive circuit elements which are remote from the first polyphase AC voltage grid are connected to all of those ends of the second inductive circuit elements which are remote from the second connections via a respective converter unit in the form of a multilevel switching module, for which purpose, in the case of three-phase AC voltage grids, in total nine converter units are required. Current and voltage measured variables of the first and second AC voltage grids are applied to the closed-loop control arrangement of the known matrix converter, and said closed-loop control arrangement is designed such that the matrix converter is controlled using space vector modulation.

BRIEF SUMMARY OF THE INVENTION

The invention is based on the object of proposing a matrix converter which not only has a comparatively simple design but also is relatively easily controllable, in order to connect two AC voltage grids of different voltage levels and/or different frequency to one another.

In order to achieve this object, in a matrix converter of the type specified at the outset, according to the invention in each case a first converter unit in an embodiment as a controllable AC voltage source is arranged between those ends of the first inductive circuit elements which are remote from the first AC voltage grid and ground potential, in each case one second converter unit in an embodiment as a controllable AC voltage source is connected between those ends of the first inductive circuit elements which are remote from the first AC voltage grid and those ends of the second inductive circuit elements which are remote from the second AC voltage grid, and the closed-loop control arrangement is connected to control inputs of the first and second converter units in such a way that the electrical power flowing to the matrix converter is equal to the electrical power flowing out of the matrix converter.

An essential advantage of the matrix converter according to the invention consists in that it has a comparatively simple design by virtue of it managing with only three first converter units and only three second converter units in the case of three-phase AC voltage grids, i.e. in total only six converter units are required. A further essential advantage consists in that the closed-loop control arrangement can have a comparatively simple embodiment because, with it, the matrix converter only needs to be controlled such that the electrical power flowing to the matrix converter is equal to the electrical power flowing out of the matrix converter, in order to be able to adjust the voltage at the second AC voltage grid, starting from the voltage at the first AC voltage grid, as desired corresponding to desired presets with respect to voltage level and/or frequency.

In the matrix converter according to the invention, controllable converter units of different embodiments can be used if they are suitable for forming controllable AC voltage sources given corresponding actuation.

In the matrix converter according to the invention, particularly suitable controllable converter units are multilevel converter units. These can comprise, for example, half-bridge submodules. However, it is considered particularly advantageous if the modular multilevel converter units comprise H bridge submodules, because, as a result, the disconnection possibility of the current is ensured and higher degrees of modulation are possible.

It is particularly advantageous if the capacitors of the H bridge submodules are storage capacitors with a very high capacitance in the farads range, which are also referred to as supercapacitors. As an alternative to this, energy stores, such as batteries, can be connected in parallel with the capacitors having a conventional design in the H bridge submodules. Secondly, energy stores can be connected to the intermediate circuit capacitor via actuators.

In the matrix converter according to the invention, the inductive circuit elements can also be configured differently. It is considered to be particularly advantageous if the inductive circuit elements are inductors because these can be produced comparatively easily and are thus inexpensive.

If appropriate, however, it may also be advantageous if the inductive circuit elements are transformers because the transformation ratio of the entire matrix converter can thus be optimized; in addition, special demands on insulation can therefore be met.

The invention is also based on the object of specifying a method for generating an AC voltage in a second polyphase AC voltage grid from a polyphase AC voltage in a first AC voltage grid by means of a matrix converter, which has a connection to the first AC voltage grid and the second AC voltage grid, first inductive circuit elements, which are each connected to the first AC voltage grid, and second inductive circuit elements which are each connected to the second AC voltage grid, a switching matrix, which connects those ends of the first inductive circuit elements which are remote from the first AC voltage grid to those ends of the second inductive circuit elements which are remote from the second AC voltage grid, wherein the switching matrix comprises controllable converter units, and a closed-loop control arrangement, which is connected to control inputs of the controllable converter units, wherein current and voltage measured variables of the first and second AC voltage grids are applied to the closed-loop control arrangement.

Such a method can be gleaned from the U.S. Pat. No. 6,900,998 B2 already mentioned above. Against this background, the invention provides that in the case of a matrix converter comprising in each case one first converter unit in an embodiment as a controllable AC voltage source, which is arranged between those ends of the first inductive circuit elements which are remote from the first AC voltage grid and ground potential, and in each case one second converter unit in an embodiment as a controllable AC voltage source, which is connected between those ends of the first inductive circuit elements which are remote from the first AC voltage grid and those ends of the second inductive circuit elements which are remote from the second AC voltage grid, the converter units are controlled by means of the closed-loop control arrangement in such a way that the electrical power flowing to the matrix converter is equal to the electrical power flowing out of the matrix converter.

The advantages which have already been described above in connection with the converter according to the invention can be achieved with this method.

For further elucidation of the invention,

DESCRIPTION OF THE INVENTION

Figure 1:
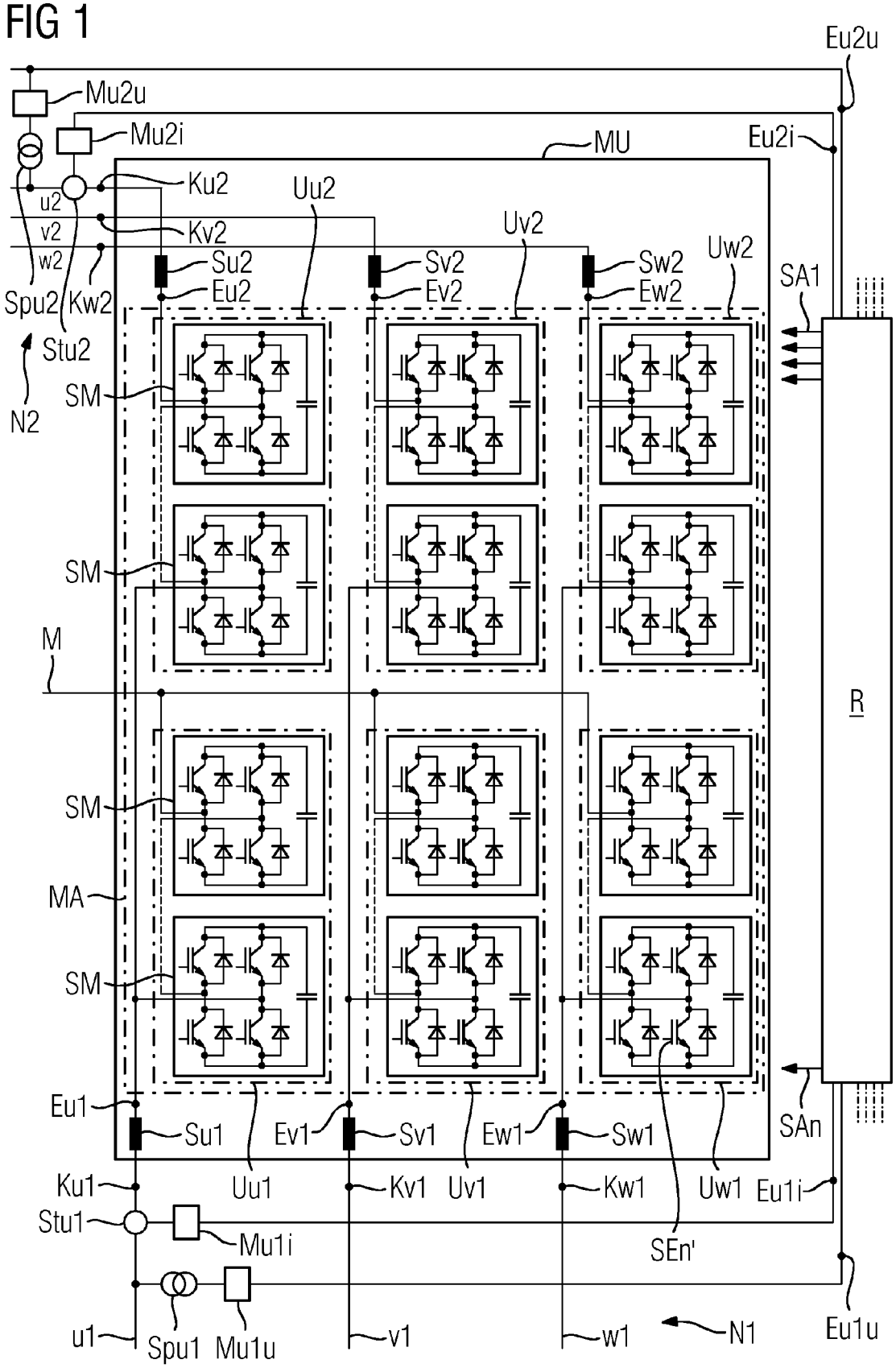
FIG. 1 shows an exemplary embodiment of the matrix converter according to the invention comprising inductors as inductive circuit elements.

FIG. 1 shows a matrix converter MU, which is connected to a first polyphase AC voltage grid N1 with the phase conductors u1, v1 and w1. Secondly, the matrix converter MU is also connected to the phase conductors u2, v2 and w2 of a second polyphase AC voltage grid N2.

The matrix converter MU is connected at first connections Ku1, Kv1 and Kw1 to the phase conductors u1, v1 and w1 of the first AC voltage grid N1. First inductive circuit elements Su1, Sv1 and Sw1 with their respective one end are connected to these first connections Ku1, Kv1 and Kw1. Those ends Eu1 and Ev1 and Ew1 of the inductive circuit elements Su1, Sv1 and Sw1 which are remote from the first connections Ku1, Kv1 and Kw1 and therefore from the first AC voltage grid N1 are connected to in each case one first converter unit Uu1, Uv1 and Uw1 of a switching matrix MA. These first converter units Uu1, Uv1 and Uw1 are connected jointly on ground potential M on the output side.

As can further be seen in FIG. 1, the ends Eu1, Ev1 and Ew1 of the first inductive circuit elements Su1, Sv1 and Sw1 are also connected to second converter units Uu2, Uv2 and Uw2, which for their part are connected on the output side to those ends Eu1, Ev2 and Ew2 of second inductive circuit elements Su2, Sv2 and Sw2 which are remote from the second AC voltage grid N2. These circuit elements Su2, Sv2 and Sw2 are connected to the second AC voltage grid N2 via second connections Ku2, Kv2 and Kw2.

It can also be seen from FIG. 1 that each of the converter units Uu1, Uv1 and Uw1 or Uu2, Uv2 and Uw2 is implemented as a modular multilevel converter, in each case having a number n of submodules SM, as is known per se. The submodules SM are configured as a so-called H bridge circuit, which is likewise known and therefore does not need to be described in more detail here. The control connections of these submodules SM are also only indicated here.

The number of submodules SM in the first and second converter units Uu1, Uv1 and Uw1 and Uu2, Uv2 and Uw2, respectively, is selected in respect of the desired voltage amplitude in the second AC voltage grid N2 when the first AC voltage grid N1 is the feed grid.

It can also be seen from FIG. 1 that a closed-loop control arrangement R is associated with the matrix converter MU, with measured variables of the first and second AC voltage grids N1 and N2, respectively, being applied on the input side to said closed-loop control arrangement. For this purpose, a current transformer Stu1 is arranged in the phase conductor u1, and a measured value processing device Mu1$i$ is connected downstream of said current transformer, and a current which is proportional to the respective current in the phase conductor u1 is fed from said measured value processing device to an input Eu1$i$. The voltage at the phase conductor u1 is detected by means of a voltage transformer Spu1, which has a measured value converter Mu1$u$ connected downstream thereof. A voltage which is proportional to the voltage at the phase conductor u1 passes via an input Eu1$u$ into the closed-loop control arrangement R. Further inputs (only illustrated schematically) of the closed-loop control arrangement R are provided for the purpose of correspondingly supplying current and voltage measured variables to the phase conductors v1 and w1 of the closed-loop control arrangement R.

Correspondingly, current and voltage measured variables are also detected at the phase conductors u2, v2 and w2 of the second AC voltage grid N2 by virtue of a current measured variable being supplied via an input Eu2$i$ to the closed-loop control arrangement R via a power transformer Stu2 and a measured value conditioning device Mu2$i$; the corresponding voltage at the phase conductor u2 is supplied to the closed-loop control arrangement R via a further input Eu2$u$ by means of a voltage transformer Spu2 with a downstream measured value conditioning arrangement Mu2$u$. Further inputs (only indicated schematically at the closed-loop control arrangement R) are used for detecting, in a corresponding manner, the current and voltage measured variables at the phase conductors v2 and w2 and passing them on to the closed-loop control arrangement R for further processing.

In addition, the closed-loop control arrangement R is provided with control outputs SA1 to SAn, which are connected to the various control inputs of the submodules SM in a manner which is not illustrated. Given a corresponding design of the closed-loop control arrangement R, the individual submodules SM can be controlled in such a way that two AC voltage sources are formed by the first and second converter units Uu1, Uv1 and Uw1 or Uu2, Uv2 and Uw2, which AC voltage sources result in an AC voltage with the desired level and/or frequency at the AC voltage grid N2; in this case, the closed-loop control arrangement R ensures that the power flowing into the matrix converters MU from the first AC voltage grid N1 is equal to the power fed into the second AC voltage grid N2.

Figure 2:
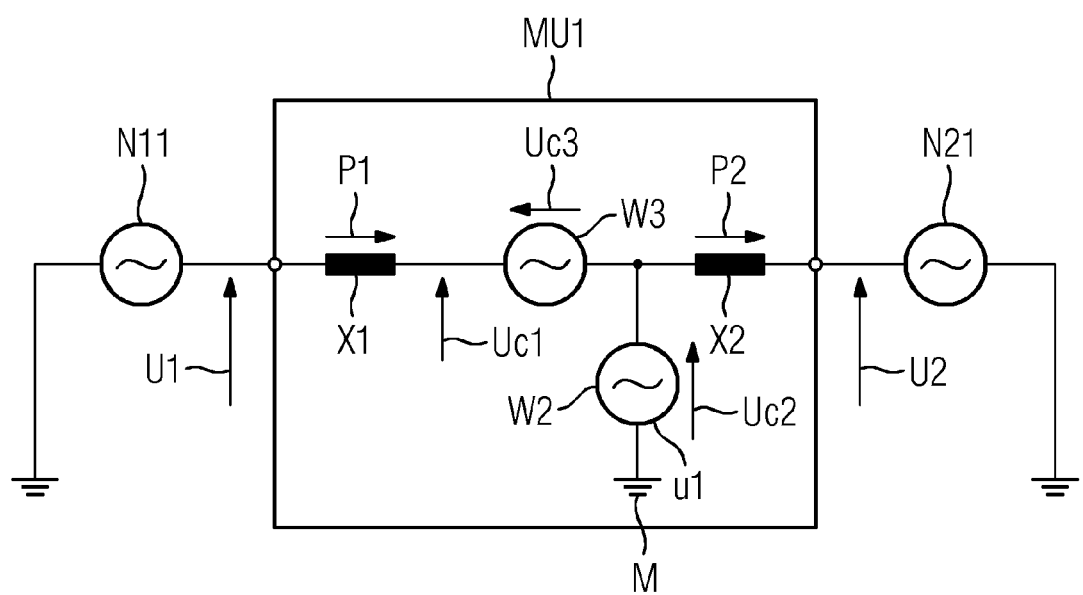
FIG. 2 shows a basic illustration of the matrix converter according to the invention for a single phase for more detailed elucidation of its mode of operation.

FIG. 2, in which, by way of example, the control of the matrix converter is explained on the basis of one phase, is used for further explaining the mode of operation of the matrix converter according to the invention. The converter MU1 illustrated here which conceivably, for example, contains the two converter units Uu1 and Uu2 shown in FIG. 1, is firstly at a first AC voltage grid N11 (for example phase conductor u1 shown in FIG. 1), at which a voltage u1 is present. This voltage U1 is applied to the converter MU1. An AC voltage source W2 of the converter MU1 in the selected example conceivably corresponds to the first converter unit Uu1 and generates a further converter voltage Uc2; the AC voltage source W2 is firstly at ground potential M and is secondly connected to a further AC voltage source W3, which corresponds to the second converter unit Uu2 shown in FIG. 1. An additional converter voltage Uc3 occurs at this further AC voltage source W2. By virtue of the closed-loop control arrangement not illustrated here, actuation of the converter units or of the AC voltage sources W2 and W3 is implemented in such a way that the power P1 from the AC voltage grid N11 which is fed via the inductor X1 (inductive circuit element Su1) corresponds to the power P2 which is provided via the inductor X2 (second inductive circuit element Su2 in FIG. 1) to the second grid N2 with a voltage U2. It therefore always ensures that, taking into consideration the differences between the voltage U1 and the voltage U2, both powers P1 and P2 are equal, which can be represented by means of formulae in the following way:

$$P1=\{U1.Uc1\sin(\delta1)\}/X1 \quad (1)$$

$$P2=\{U2.Uc2\sin(\delta2)\}/X2 \quad (2)$$

In these equations (1) and (2), $\delta1$ and $\delta2$ are the phase differences at the inductive switching elements X1 and X2. The voltage Uc1 is provided by the equation (3):

$$Uc1=(Uc2+Uc3) \quad (3)$$

It is clear from this that it is possible, by controlling the power flow, to adjust the voltage level, phase and frequency of the voltages Uc2 and Uc3 given a predetermined voltage U1 or voltage at the phase conductor u1 as shown in FIG. 1 by controlling the AC voltage sources W2 and W3 or the first and second converter units Uu1 and Uu2 in such a way that, in the second AC voltage grid N21 or N2 shown in FIG. 1, the desired voltage U2 is produced.

The invention claimed is:

1. A matrix converter connected to a first polyphase AC voltage grid and to a second polyphase AC voltage grid, the matrix converter comprising:
   first inductive circuit elements each connected to the first polyphase AC voltage grid;
   second inductive circuit elements each connected to the second polyphase AC voltage grid;
   a switching matrix connecting ends of said first inductive circuit elements being remote from the first polyphase AC voltage grid to ends of said second inductive circuit elements being remote from the second polyphase AC voltage grid, said switching matrix having controllable converter units with control inputs;
   a closed-loop controller connected to said control inputs of said controllable converter units, wherein current and voltage measured variables of the first and second polyphase AC voltage grids being applied to said closed-loop controller;
   said controllable converter units having first converter units, each of said first converter units are electrically connected with one of said first inductive circuit elements respectively, and said first converter units are electrically connected with a ground potential respectively, said first converter units being in each case a controllable AC voltage source;
   said controllable converter units having second converter units, each of said second converter units are electrically connected with one of said first inductive circuit elements respectively, and each of said second converter units are electrically connected with one of said second inductive circuit elements respectively, said second converter units being in each case a controllable AC voltage source; and
   said closed-loop controller connected to said control inputs of said first and second converter units such that electrical power flowing to said matrix converter is equal to the electrical power flowing out of said matrix converter.

2. The matrix converter according to claim 1, wherein said first and second converter units are multilevel converter units.

3. The matrix converter according to claim 2, wherein said multilevel converter units have H bridge submodules.

4. The matrix converter according to claim 3, wherein said H bridge modules have storage capacitors being supercapacitors.

5. The matrix converter according to claim 4, wherein said H bridge modules have energy stores connected in parallel with said storage capacitors.

6. The matrix converter according to claim 1, wherein said first and second inductive circuit elements are inductors.

7. The matrix converter according to claim 1, wherein said first and second inductive circuit elements are transformers.

8. A method for generating an AC voltage in a second polyphase AC voltage grid from a polyphase AC voltage in a first AC voltage grid, which comprises the steps of:
   providing a matrix converter having a connection to the first AC voltage grid and the second polyphase AC voltage grid, first inductive circuit elements each connected to the first AC voltage grid, second inductive circuit elements each connected to the second polyphase AC voltage grid, and a switching matrix connecting ends of the first inductive circuit elements remote from the first AC voltage grid to ends of the second inductive circuit elements remote from the second polyphase AC voltage grid, wherein the switching matrix has controllable converter units;
   providing a closed-loop controller connected to control inputs of the controllable converter units, wherein current and voltage measured variables of the first and second polyphase AC voltage grids are applied to the closed-loop controller;
   providing first converter units which are each electrically connected with one of said first inductive circuit elements respectively, said first converter units are electrically connected with a ground potential respectively, said first converter units being in each case a controllable AC voltage source;
   providing second converter units each electrically connected with one of said first inductive circuit elements respectively, said second converter units are each electrically connected with one of said second inductive circuit elements respectively, said second converter units being in each case a controllable AC voltage source, the first and second converter units controlled by means of the closed-loop controller such that electrical power flowing to the matrix converter is equal to the electrical power flowing out of the matrix converter.

9. The method according to claim 8, which further comprises providing multilevel converter units as the first and second converter units.

10. The method according to claim 9, which further comprises providing H bridge submodules as the multilevel converter units.

11. The method according to claim 8, which further comprises providing inductors as the first and second inductive circuit elements.

12. The method according to claim 8, which further comprises providing transformers as the first and second inductive circuit elements.

* * * * *